United States Patent [19]

Wickes et al.

[11] Patent Number: 4,821,228

[45] Date of Patent: Apr. 11, 1989

[54] METHOD AND APPARATUS FOR COMPUTATION STACK RECOVERY IN A CALCULATOR

[75] Inventors: William C. Wickes, Corvallis; Laurence W. Grodd, Portland, both of Oreg.

[73] Assignee: Hewlett-Packard Company, Palo Alto, Calif.

[21] Appl. No.: 946,543

[22] Filed: Dec. 24, 1986

[51] Int. Cl.⁴ .................... G06F 15/06; G06F 11/00
[52] U.S. Cl. ............................... 364/900; 364/706; 364/710.05
[58] Field of Search ... 364/900 MS File, 200 MS File; 371/12

[56] References Cited

U.S. PATENT DOCUMENTS

| | | | |
|---|---|---|---|
| 4,309,761 | 1/1982 | Reach et al. | 364/900 |
| 4,366,553 | 12/1982 | Spangler et al. | 364/900 |
| 4,456,964 | 6/1984 | Olander, Jr. et al. | 364/710 |
| 4,491,912 | 1/1985 | Kainaga et al. | 364/200 |
| 4,519,045 | 5/1985 | Caldwell et al. | 364/715 |
| 4,524,416 | 6/1985 | Stanley et al. | 364/200 |
| 4,530,049 | 7/1985 | Zee | 364/200 |
| 4,566,103 | 1/1986 | Sato et al. | 371/12 |
| 4,587,632 | 5/1986 | Ditzel | 364/900 |
| 4,698,784 | 10/1987 | Abell | 364/200 |

Primary Examiner—Gareth D. Shaw
Assistant Examiner—Viet Q. Nguyen

[57] ABSTRACT

A method and apparatus for recovery of a computation stack in a calculator is presented in accordance with a preferred embodiment of the present invention. In a calculator employing a stack for the storage of data to be utilized in a calculation, provision is made to store the contents of the stack before a calculation is performed. If, after the calculation is performed a user desires to "undo" the calculation, he may strike an "undo" key. The original state of the stack is then restored.

9 Claims, 22 Drawing Sheets

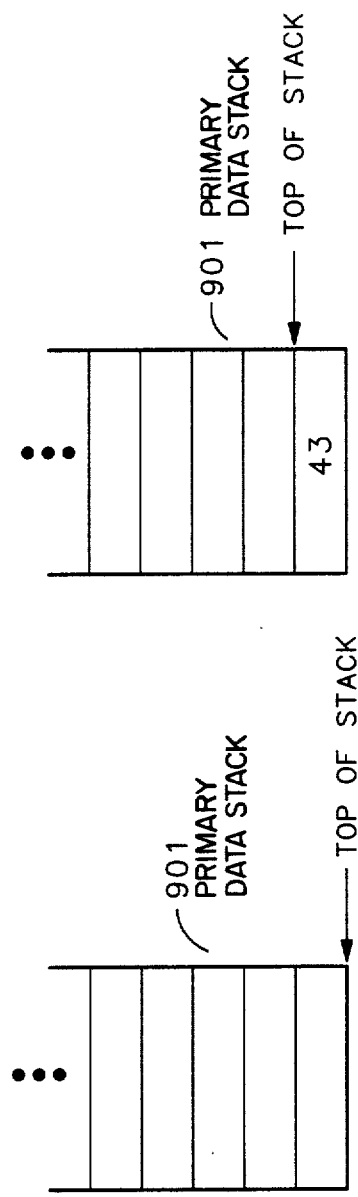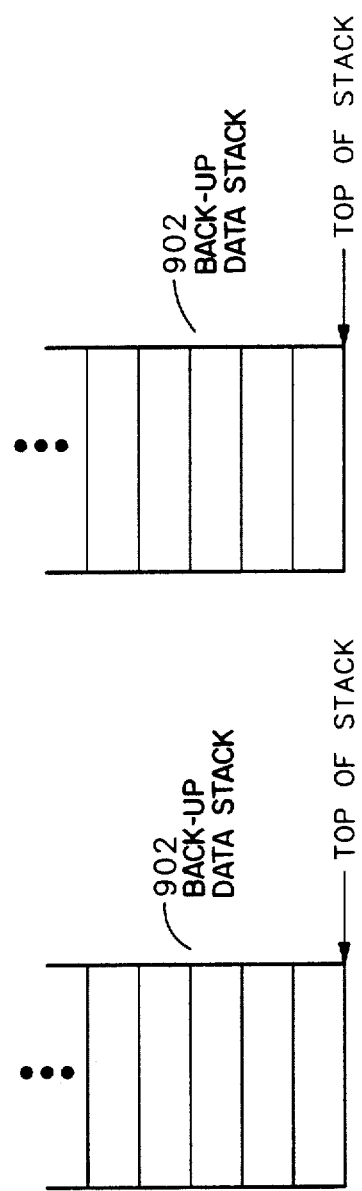
FIG 9B
FIG 9A

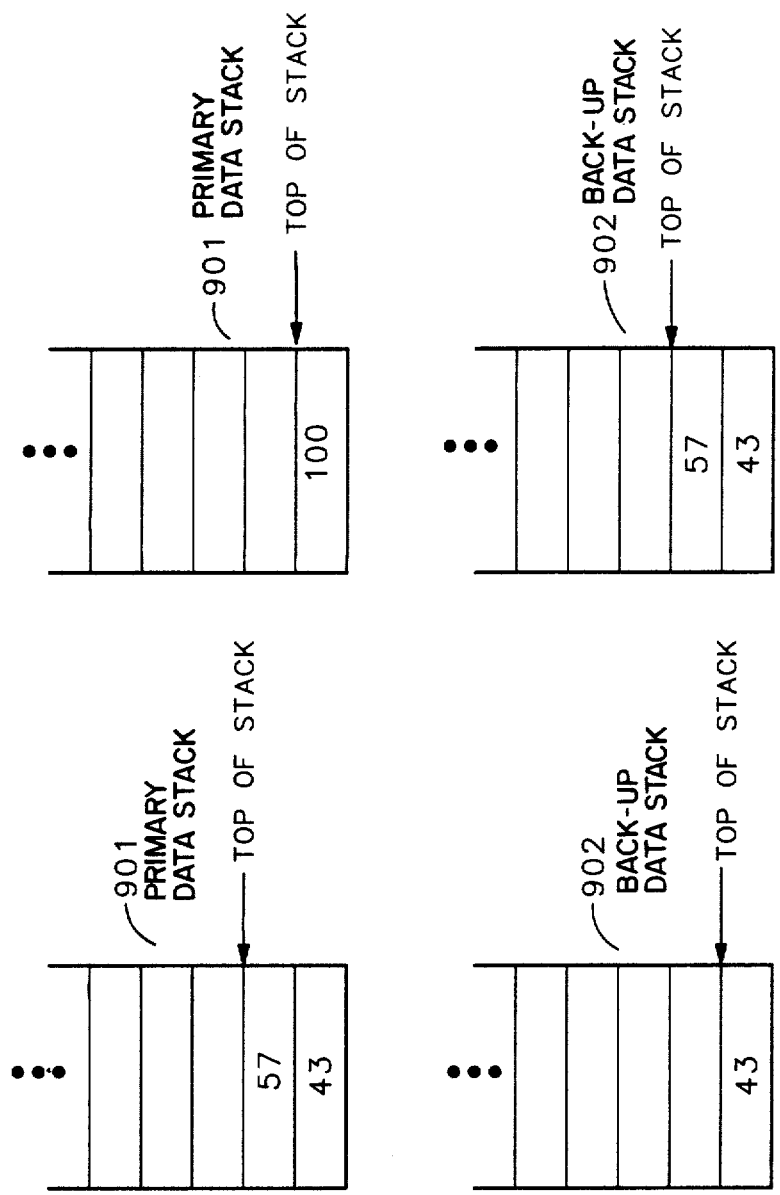

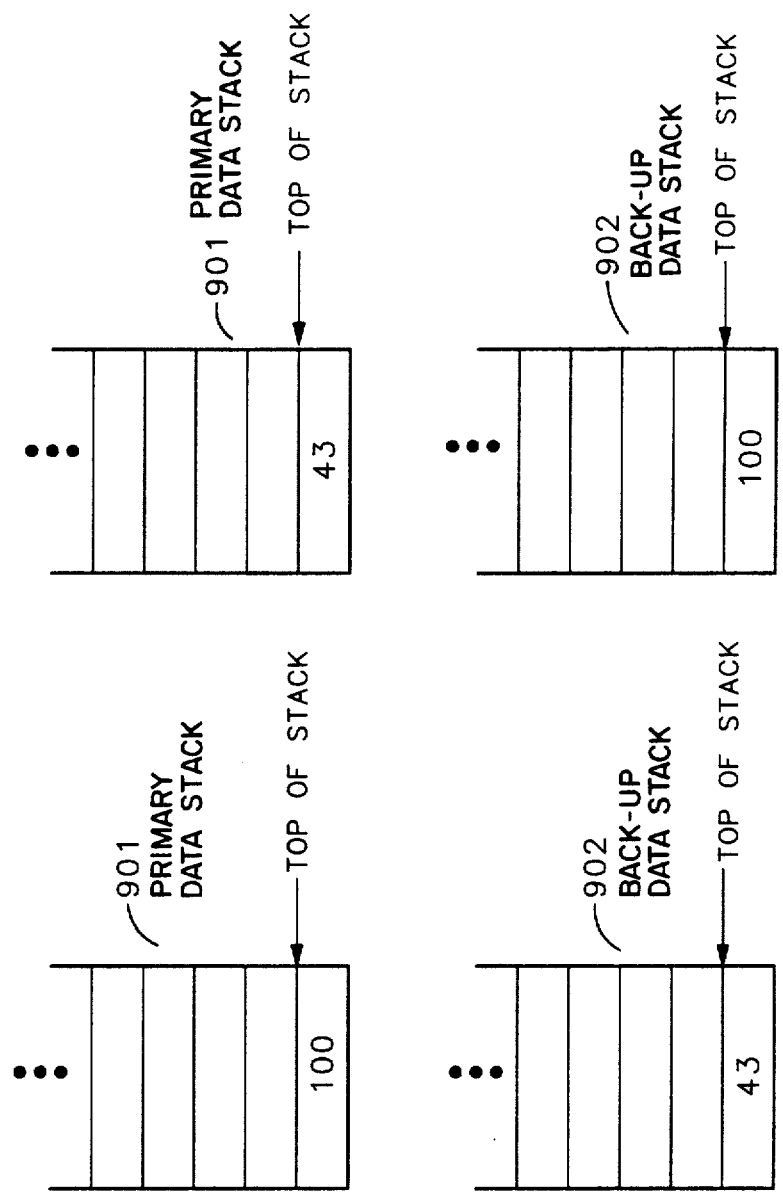

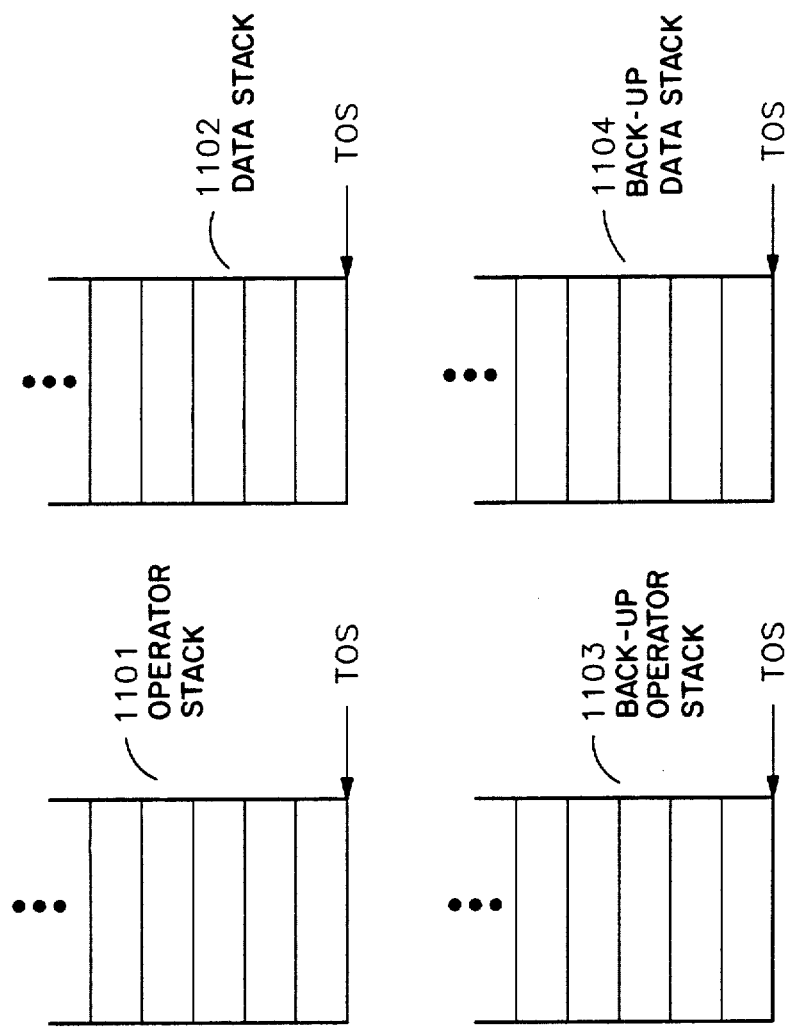

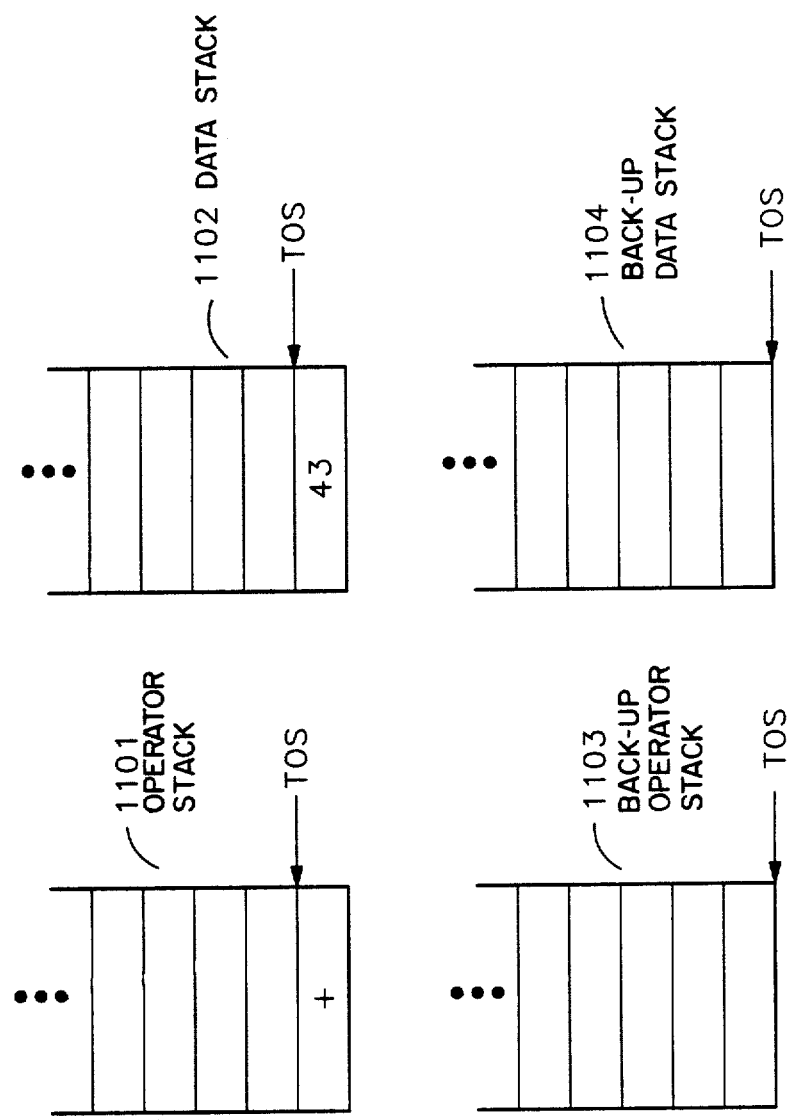

METHOD AND APPARATUS FOR COMPUTATION STACK RECOVERY IN A CALCULATOR

BACKGROUND

The present invention is concerned with error recovery for calculators. Typically in the past, there has been only minimal error correction available for calculators.

One example of error correction is found on Hewlett-Packard Company's Model 41C calculator, where the last value in the display may be recalled. The calculator has an "X" register and a "Last X" register. The contents of the X register are displayed. The Last X register preserves the value that was last in the X register before the execution of a function. To place the contents of the Last X register back into the displayed X register, a "LAST X" function key may be depressed.

The above error correction scheme, although providing some level of protection, does not allow for error correction when a function operates on more than one register. Therefore, for a calculator able to perform operations utilizing more than one register a more extensive error correction scheme is desirable.

SUMMARY OF THE INVENTION

In accordance with the preferred embodiment of the present invention, a method and apparatus for recovery of a computation stack in a calculator. In a calculator employing stacks for the storage of operators and data to be utilized in a calculation, provision is made to store the contents of the stacks before a calculation is performed. If, after the calculation is performed a user desires to "undo" the calculation, he may strike an "undo" key. The original state of the stacks are then restored.

The capability to undo the calculation of an equation is a superior error recovery system than available on any current user stack oriented mathematical computation device. It completely removes the effects of an accidental or incorrect key press or command execution. It also permits the application of a sequence of operations, each applied to the same set of arguments, without requiring the calculator user to reenter all of the arguments for each operation. It is completely general, in that it is independent of the nature of the applied commands, the number or types of the corresponding arguments and results, or the number of objects in total present on the stack.

BRIEF DESCRIPTION OF THE DRAWINGS

FIGS. 9A–9G show the contents of a data stack and a back-up data stack in accordance with the RPN embodiment as shown in FIG. 8.

FIG. 11A–11F show the contents of a data stack, a back-up data stack, an operator stack and a back-up operator stack in accordance with the non-RPN embodiment as shown in FIG. 10.

DESCRIPTION OF THE PREFERRED EMBODIMENT

Figure 1:
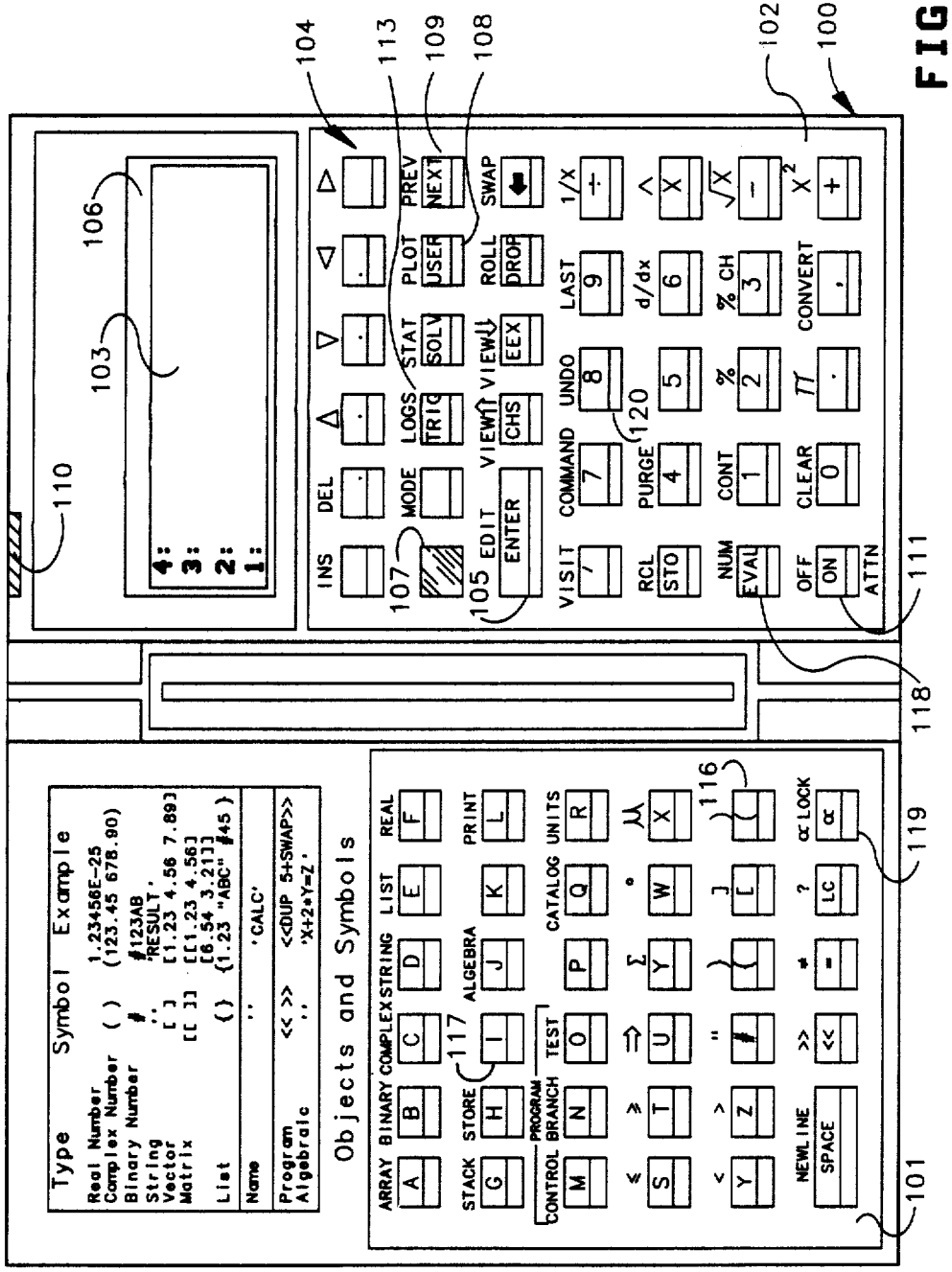
FIG. 1 shows the keyboard and display of a calculating device in accordance with a preferred embodiment of the present invention.

In FIG. 1, a calculating device 100 is shown having a first section 101 and a second section 102. First section 101 includes a plurality of keys, which include keys for entering alphanumeric symbols.

Second section 102 includes a display 103. In the preferred embodiment, display 103 is a liquid crystal, dot array display which displays four lines of twenty-three characters each. Display 103 also includes a top line 106 of annunciators, (not shown), which are used individually to indicate various calculator modes of object execution and/or operation.

Second section 102 also includes a plurality of keys, including number keys and function keys as labeled. An ENTER key 105 is used to terminate alphanumeric character entry and to begin processing of the entry (see FIG. 7A and 7B). A shift key 107 acts to cause the next key pressed to execute its alternate definition, as labeled above the key.

Second section 102 also includes a row of six multi-function keys 104, which may have associated with them a function or the value of a variable. The current definition of a multi-function key is indicated by a menu label displayed directly above these keys, in the bottommost character row of the display 103.

First and second sections 101 and 102 contain various keys that assign groups (menus) of associated calculator functions, in menu subgroups of 6 to the multi-function keys 104. A menu label for each calculator function is displayed above each key 104. Included is a USER menu key 108, that assigns user variables automatically to the multifunction keys 104. A NEXT key 109 causes the multifunction key assignments to advance to the next group of six functions in the current menu. The shifted function, PREV, of this key 109 reactivates the previous six functions.

Second section 102 also contains an infrared light-emitting diode 110, which is used for transmitting data to a corresponding receiver, typically a printing device.

The ON key 111 is a special interrupt key that allows the user to turn the calculator on or off, and to interrupt normal calculator operation when the calculator is on.

In the Disclosure of the Invention, individual mathematical or logical entities referred to as objects are said to be displayed and manipulated on a last in first out stack of indefinite size. Calculator operation centers around the evaluation of objects on the stack. An object can be data, a name, or a procedure. Data objects do nothing special (they are just data), name objects refer to other objects and procedure objects process the objects and commands in their definitions. The fundamentals of this calculating operating system are described in patent application Ser. No. 868,978, filed May 30, 1986, for a Data Processing System And Method for the Direct and Indirect Execution of Uniformly Structured Objects Types, and assigned to the assignee of this invention.

In the referenced system, uniformly structured objects are indifferently mixed in object memory with object pointers. The objects address prologues of object execution sequences in memory. The object pointers address other objects. The objects are properly evaluated whether directly or indirectly addressed. A pointer selectively points to or addresses objects or object pointers.

When an object is indirectly addressed, the pointer addresses an object pointer. The object pointer addresses an object. The object's addressee in memory is addressed which initiates the object execution process.

More particularly, the object execution process employed in this invention, provides for correct and automatic evaluation of both objects and object pointers which are indifferently included in the execution sequence. The objects are provided with a uniform structure so that all objects can be indifferently executed, either directly or indirectly. Objects of different types are still uniformly structured. Each comprises at least a prologue address and a body. These two parts are contiguous in memory. The prologue address addresses a prologue in memory which describes execution of the object. The body is data. An object is pointed to, or addressed, if its prologue address part is pointed to or addressed.

The object may be a single object or a composite object. If its body is a sequence of objects and/or object pointers, it is a composite object.

In the direct execution of an object, a pointer, called an interpreter pointer, points to the prologue address of an object. This prologue address addresses a prologue of object execution in memory which directly identifies an object to execute. In indirect execution of an object the interpreter pointer points to an object pointer which in turn points to or addresses the prologue address of an object which is the object to execute. Since the object pointer does not address a prologue in memory, there is no direct identification of an object to execute. The prologue address addresses a prologue of object execution in memory.

Thus in providing uniformity of structure among the objects, in which each comprises a prologue address and a body, in the provision of prologues of object execution in memory and in the use of object pointers and interpreter pointers in which interpreter pointers and object pointers may selectively identify objects by pointing to their prologue address parts and, additionally, in which an interpreter pointer may point to an object pointer, a simple technique is provided, permitting intermixing of objects and object pointers for direct or indirect object execution with a minimum of processing steps. This reduces programming and conserves memory which significantly reduces processing overhead.

Definitions

Data Objects

These objects represent data treated as logical units: numerical data, character strings, and lists of objects.

| Data Objects | | |
|---|---|---|
| Type | Object | Description |
| Real number | Real number | Real-valued decimal floating-point number. |
| Complex number | Complex number | Complex-valued decimal floating-point number. |
| Binary integer | Binary integer | 64-bit binary integer number. |
| String | String | Character string. |
| Real array | Real vector | n-element real vector. |
| | Real matrix | nxm-element real matrix. |
| Complex array | Complex vector | n-element complex vector. |
| | Complex matrix | nxm-element complex matrix. |
| List | List | List of objects. |

Name Objects

These objects name other objects stored in user memory. Local names can be created by procedures and are automatically deleted when the procedure has completed evaluation.

| Name Objects | | |
|---|---|---|
| Type | Object | Description |
| Name | Name | Refers to an object stored in user memory. |
| | Local name | Refers to an object temporarily held in local memory. |

Variables

A variable is a combination of an arbitrary object and a name that are stored together. The name becomes the name of the variable; the other object is the value of contents of the variable. They are stored together in user memory, which is separate from the stack. Variables replace the numbered data registers and program memory found on most calculators.

Procedure Objects

These objects contain procedures-sequences of objects and commands that are processed when the procedure object is evaluated. A program object can contain any sequence of objects and commands, including those affecting the stack, user memory, or calculator modes. An algebraic object contains a limited number of object types and commands, and its syntax is similar to mathematical expressions and equations.

| Procedure Objects | | |
|---|---|---|
| Type | Object | Description |
| Program | Program | Contains any sequence of objects. |
| Algebraic | Expression | Contains a mathematical expression. |
| | Equation | Contains a mathematical equation relating two expressions. |

Programs

A program is essentially the object form of a command line. The objects and commands entered in the command line constitute a procedure. When that procedure is surrounded by the program delimiters, this indicates that the procedure is to be treated as an object that will be evaluated later.

Expressions

An expression is a procedure representing a mathematical expression that is entered and displayed in a syntax corresponding to ordinary mathematical forms. Evaluating an expression puts each object on the stack and evaluates it.

Equations

Equations are two expressions related by an equal "=" sign. Evaluating an equation produces a new equation. The new left-hand expression is the result of evaluating the original left-hand expression. The new right-hand expression is the result of evaluating the original right-hand expressions.

Commands

Commands are built-in procedures that can be included in programs. A command name as is appears in the command line (for example, DROP or SIN) can be considered to be the unquoted name of a procedure object stored in the calculator.

The Stack

The stack is a sequence of numbered levels, each holding one object. Objects enter the stack in level 1, lifting objects already in the stack to higher levels. Objects also leave the stack from level 1, dropping the objects remaining on the stack to lower levels. All objects are treated identically—simply as objects-on the stack.

Commands are provided to duplicate, delete, and reorder objects in the stack. Several of these commands are found on the key board (DROP, SWAP, ROLL, and CLEAR); others are in the STACK menu.

Most commands take input objects (called arguments) from the stack and after execution return output objects (called results) to the stack. The arguments must be present on the stack before the command is executed. The command removes its arguments and replaces them with its results. For example, the function SIN takes a value (a real or complex number, or an algebraic) from level 1, computes its sine, and returns the result to level 1. The function + takes two values from the stack and returns their sum to the stack.

This type of logic, where the command comes after the arguments, is called postfix logic or RPN, for Reverse Polish Notation.

| Annunciator | Annunciators Indication |
|---|---|
|  | A program is suspended. |
|  | The shift key has been pressed. |
|  | Alpha entry mode is active. |
|  | The calculator is busy-that is, not ready for keyboard input. |
|  | Low battery. |
|  | The current angle mode is radians. |
|  | The calculator is sending output to the printer. |

Object Entry

When a key is pressed to begin entering new objects, the character on the key is entered into a command line. The command line can contain any number of objects, represented in text form. It appears at the bottom of the display (immediately above the menu labels, if present). The command line also appears when EDIT, or VISIT is used to view or alter the contents of an existing object.

The contents of the command line are processed when ENTER is pressed (or any command or function key that automatically performs ENTER). The contents of the command line are evaluated as a program, and the command line disappears from the display.

Any number of characters can be entered into the command line. The line can be broken into several rows by pressing NEWLINE, which inserts a "newline" character (line-feed) into the command line string at the current cursor position. Newline characters act as object separators, but are otherwise ignored when the command line is evaluated.

If more than 23 characters are entered into the command line, characters scroll off the display to the left. An ellipsis ( . . . ) appears in the leftmost character position to indicate the undisplayed characters. If an attempt is made to move the cursor past the left end of the display, the leftmost characters scroll back into the display, and the characters scroll off the display to the right. an ellipsis then appears at the right end of the display. When the command line contains multiple rows of text, all rows scroll left and right together.

Figure 2:
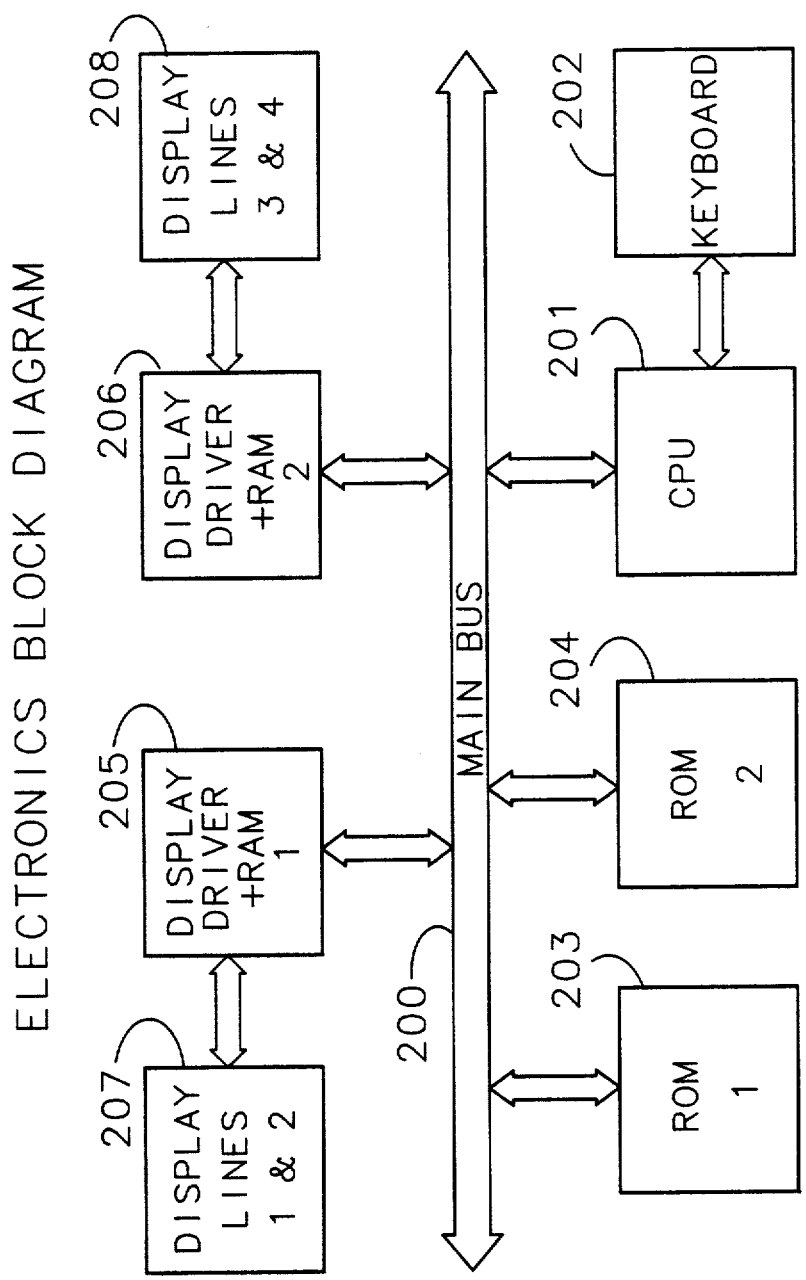
FIG. 2 shows the internal ship-level architecture of the calculating device shown in FIG. 1.

FIG. 2 shows the internal chip-level architecture of calculating device 100. A central processing unit 201, two read-only memories 203 and 204, and two combination display driver and random-access memories 205 and 206, are shown coupled to a main bus 204. Each display driver controls two character lines of the liquid crystal display 103, (207 and 208). A keyboard 202 is shown coupled to the central processing unit 201. Keyboard 202 may include two sections of keys 101 land 102, FIG. 1, but may also represent alternate forms of entry of data such as a touch-sensitive screen. The specific organization and utilization of this system and its elements in accordance with this invention will be apparent as this description develops.

Figure 3:
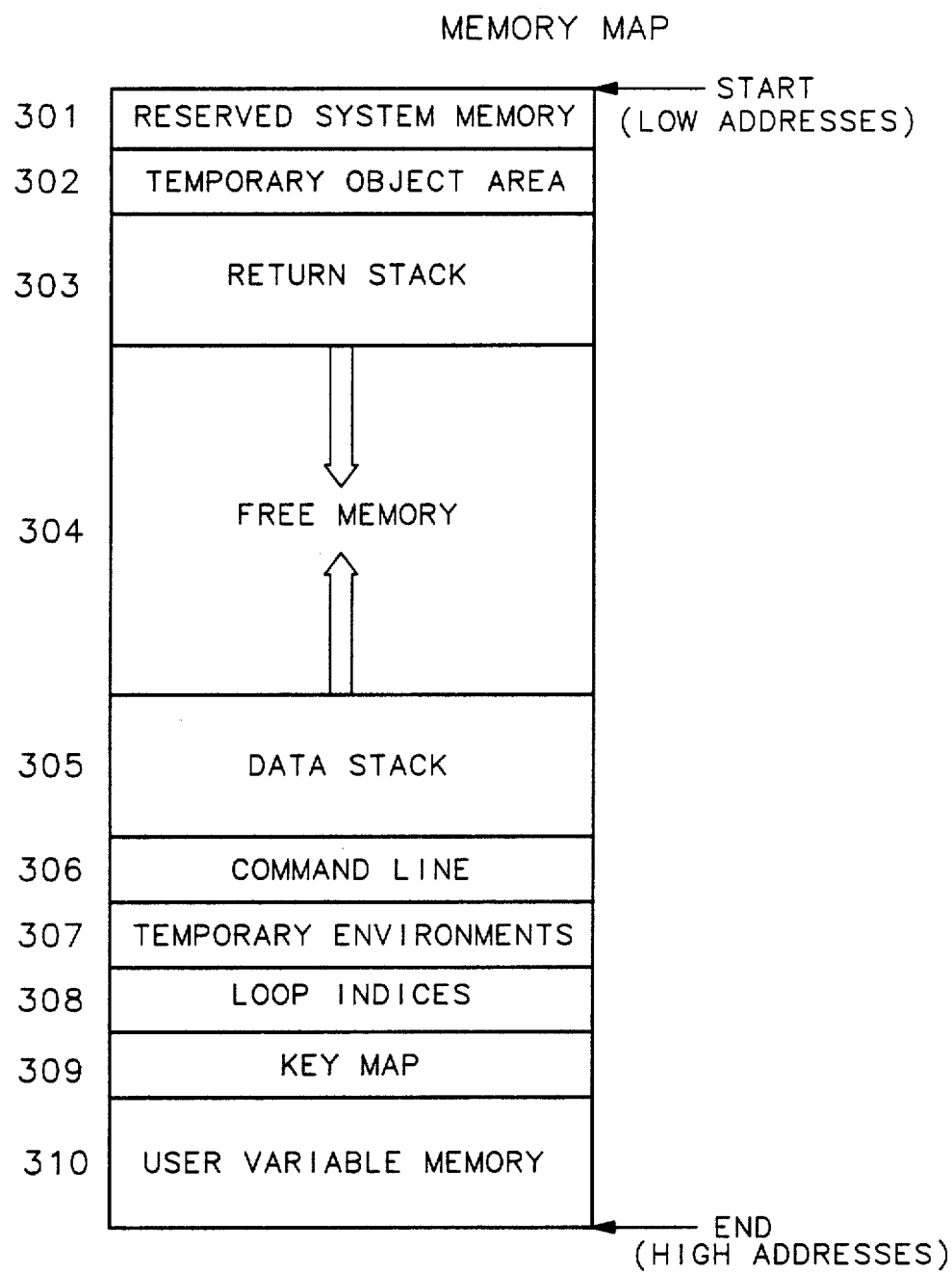
FIG. 3 shows the random access memory configuration of the calculating device shown in FIG. 1.

FIG. 3 is a map of the utilization of the random access memories 205 and 206 by the operating system contained in the read only memories 203 and 204, to support the user interface of this invention. The term object used here and in the referenced patent application, as noted above, represents any of the multiplicity of data types supported by the operating system, including mathematical data and expressions, programs, etc. Objects may exist in the read only memories 203 and 204, and in the random access memories in the temporary object area 302, or the user variable area 310. FIG. 1, sectin 101, lists object types, their symbols, and examples of objects types.

A reserve system memory 301 contains memory addresses that identify the remaining memory regions 302-310, plus other permanently allocated system data.

A temporary object area 302 contains nameless objects, created during calculator use.

A return stack memory area 303 is a last in first out stack of addresses that constitute pointers to object sequences representing pending calculator operations. This stack grows towards the end (higher addresses) of memory.

A free memory area 304 is the region of memory currently unused.

A data pointer stack memory area 305 is a last in first out stack of addresses that constitute pointers to objects. The user interface of the present inventin displays a human-readable form of the objects pointed to by the stack pointers, rather than the pointers themselves. The data pointer stack memory 305 grows into free memory towards the start (lower addresses) of memory.

A command line memory area 306 is a dynamically allocated user memory used to accumulate user-entered commands and data in the form of text characters.

A temporary environment memory area 307 is a dynamically allocated linked-list of objects used primarily for storage of intermediate results and parameter passage.

A loop indices memory area 308 is used to save start and stop indices for looping program constructs.

A key map memory area 309 defines the current functions associated with each keyboard key.

A user variable memory area 310 contains named objects (variables) created explicitly by the user.

The accessing and function of the memories and the display of the calculator, as well as the specific function of the system of FIG. 2, is demonstrated in the entry, manipulation and evaluation of the expression LN (2.3+1.0) which follows. Reference is made to FIGS. 3a through 3i.

Figure 3A:
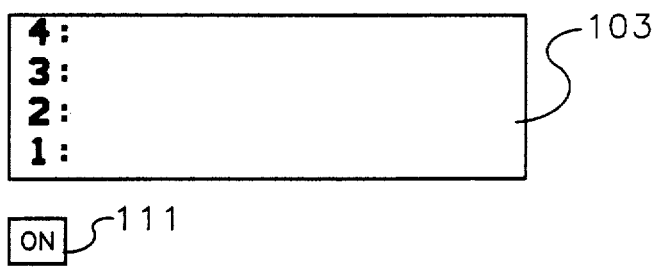
FIG. 3a–3i illustrate the display seen by the user in the step by step, entering, manipulation and evaluation of an expression.

1. Press [ON] key 111. The display is as seen in FIG. 3a. The four lines of the display are numbered on the left of the screen in descending order from top to bottom. This is an immediate entry mode.

Figure 3B:
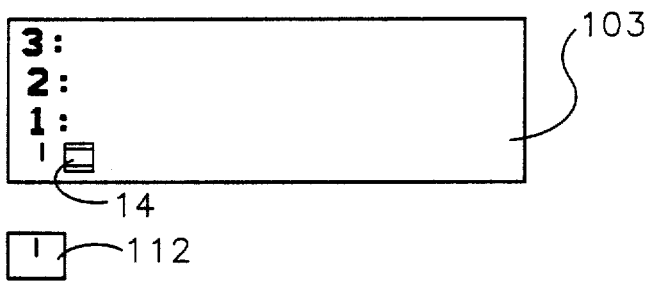

2. Press ['] key 112. This delimiter symbolizes objects (names and algebraics). The display is as seen in FIG. 3b. In the immediate entry mode (as seen in FIG. 3a), this initiates or activates the algebraic entry mode. The algebraic cursor 14 is in the lower left corner (line 1) of the display screen beside the delimiter. In this mode, pressing a key corresponding to an operation not permissible in an algebraic expression executes the operation corresponding to the key. Pressing an algebraic function key adds the function name to the command line. If the function (LN) takes its arguments in parentheses, such as LN (2.3 +1.0), the opening parentheses is also added. Lines 1 to 4 are shifted up leaving lines 1, 2 and 3 visible.

Figure 3C:
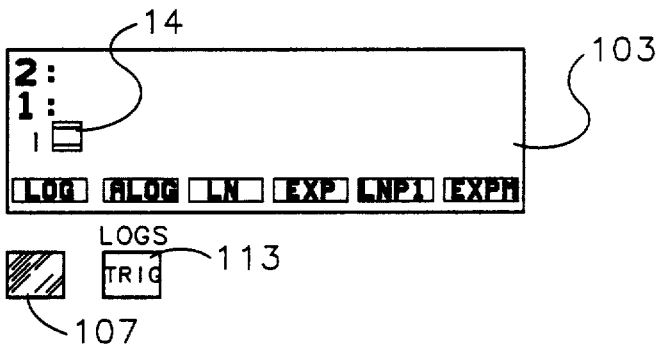

3. Press the shift key 107 and the shifted LOGS key 113. The display is as seen in FIG. 3c. The individual menu labels 15 are displayed on line 1. The algebraic cursor 14 is lifted to line 2 and lines 1 to 4 are shifted up, leaving numbered lines 1 and 2 visible.

Figure 3D:
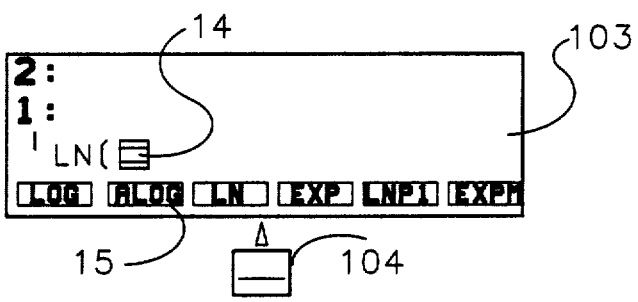
Figure 3E:
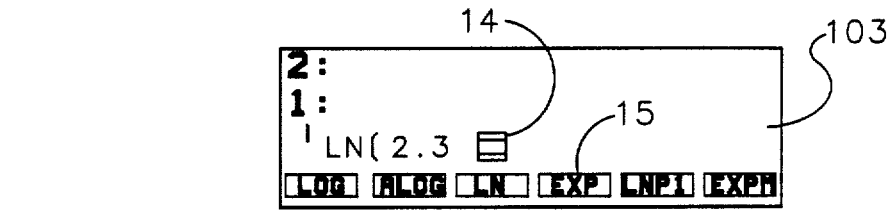
Figure 3F:
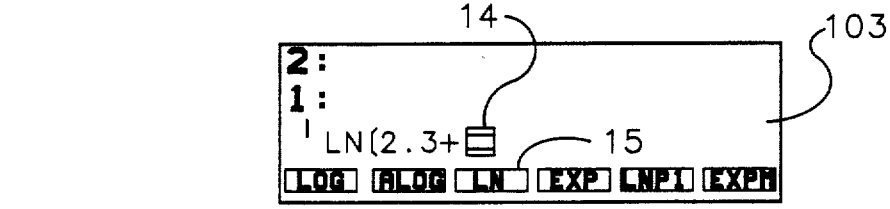
Figure 3G:
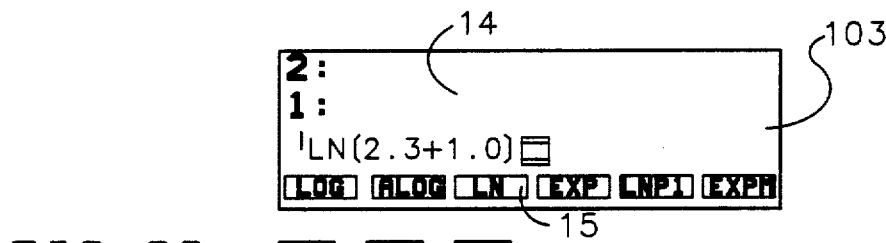
Figure 3H:
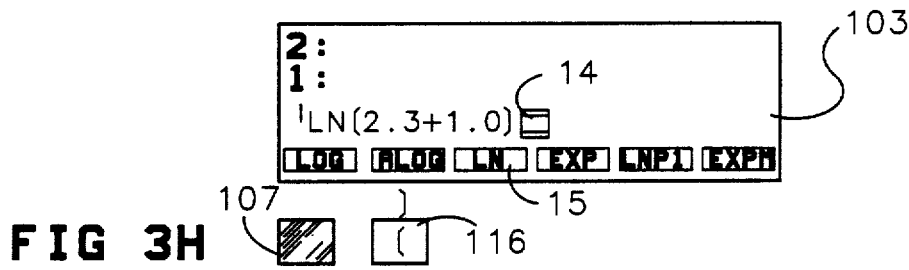

4. Press LN. This is that menu key 104 immediately below label LN in the menu display. The display is as indicated in FIG. 3d. The function LN with a bracket or parentheses on its right is added in line 2 and the algebraic cursor 14 is shifted to the right.

5. The expression 2.3+1.0 is now added by actuating the correspondingly marked keys in sequence. The displays corresponding to these steps appear in 3e, f, and g. The menu labels remain unchanged.

6. Next press the shift key 107 and the shifted key 116. This adds the bracket, FIG. 3h, to the end of the expression, which completes the quantity (2.3+1.0).

Figure 3I:
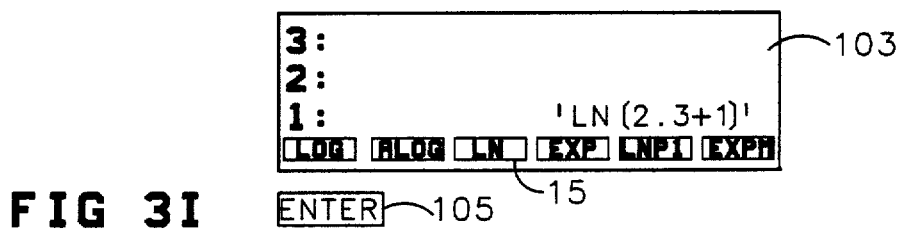

7. The ENTER key 105 is now actuated. This shifts the expression to the right side of the display, as seen in FIG. 3i, and enters the expression at the bottom of the display stack. The cursor 14 disappears.

Figure 4:
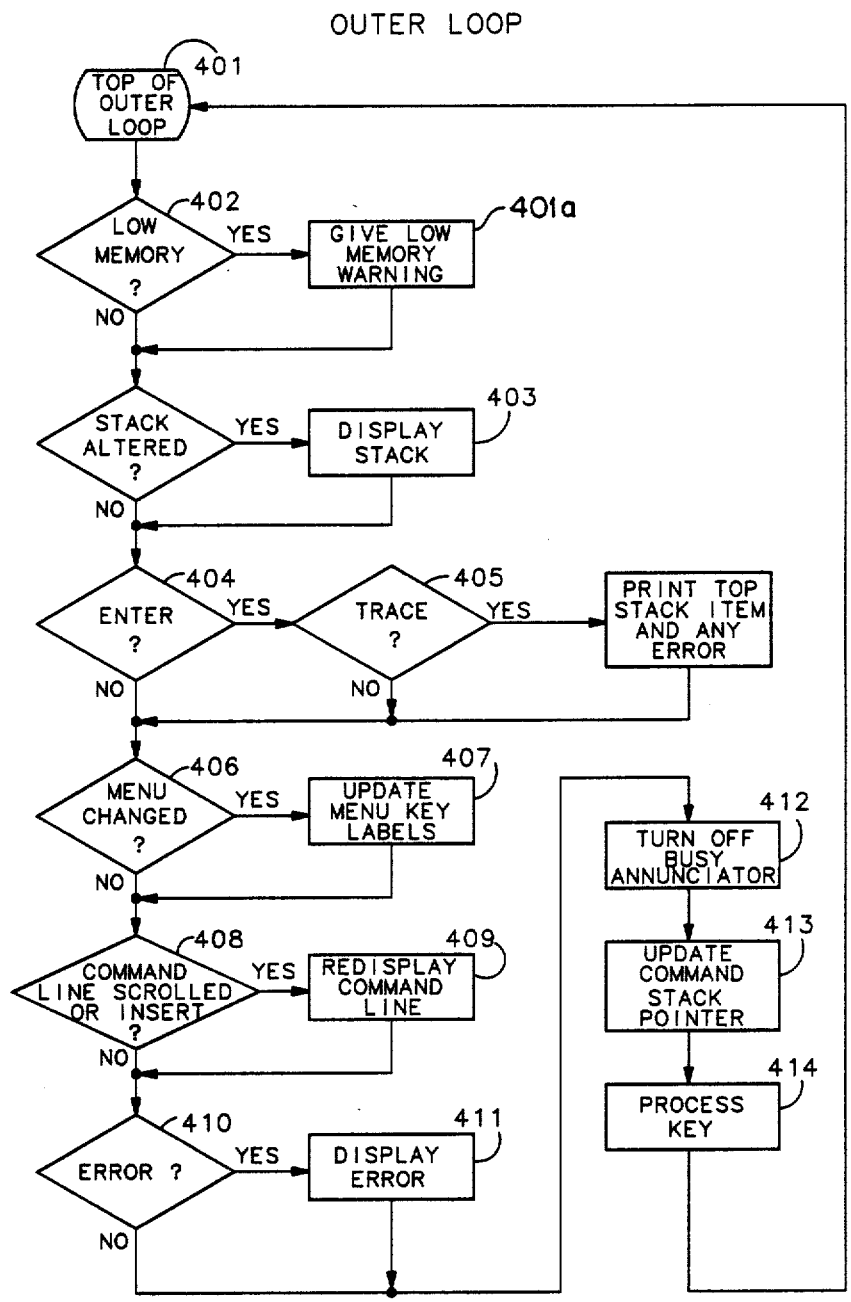
FIG. 4 is a flowchart representing the logical implementation of the user interface of the calculator.

FIGS. 4, 5, 6, 7a, and 7b show flowcharts representing the logical implementation of the user interface of the present invention. The "outer loop" shown in FIG. 4 is an endless loop constituting the outermost level of user interaction. Terms used in this diagram are as follows:

1. The top Outer Loop function 401 is a logical start of the loop.

2. The low memory function (402) means a condition where available free memory 304 is so small that normal calculator operation becomes difficult. A low memory warning 401a is displayed.

3. The display stack function (403) (memory area 305) provides data stack objects from the data stack memory area 305 to user-readable characters which are entered on the right side of the display 103. The logic of this step is expanded in FIG. 5. The stack altered function 403a initiates the display.

4. The ENTER function (404) refers to the operation of parsing and executing the contents of the command line 306, which can be initiated by pressing any immediate-execute key, particularly the [ENTER] key 105.

5. The TRACE function (405) refers to a user-controlled calculator mode. When trace mode is active, all user input and calculator results are automatically transmitted for printing via the infrared light-emitting diode 110.

6. The selection of a different menu for execution requires a new menu display for user viewing and interaction, if necessary. Decision function 406, Menu Changed, initiates displaying the new menu label, function 407. When the command line is changed, a new line is displayed. Decision function 408 initiates the redisplay function 409.

7. The Error decision function 410 refers to any calculator mathematical or logical error that interrupts the normal completion of a calculator operation. It initiates the display error function 411.

8. The Busy annunciator function (412) relates to the display of that annunciator in line 106. This annunciator indicates that the calculator is bus, i.e., not ready to process new keystrokes. It is turned off automatically.

9. The command stack function 413 which updates the command stack pointer which is a stack of four most recent command line entries, saved for subsequent reuse. These are entries in memory area 306.

10. The process key step (414) waits for and processes each key press. It is detailed in FIG. 6. The outer loop may wait indefinitely at this stage while awaiting new keyboard input.

Figure 5:
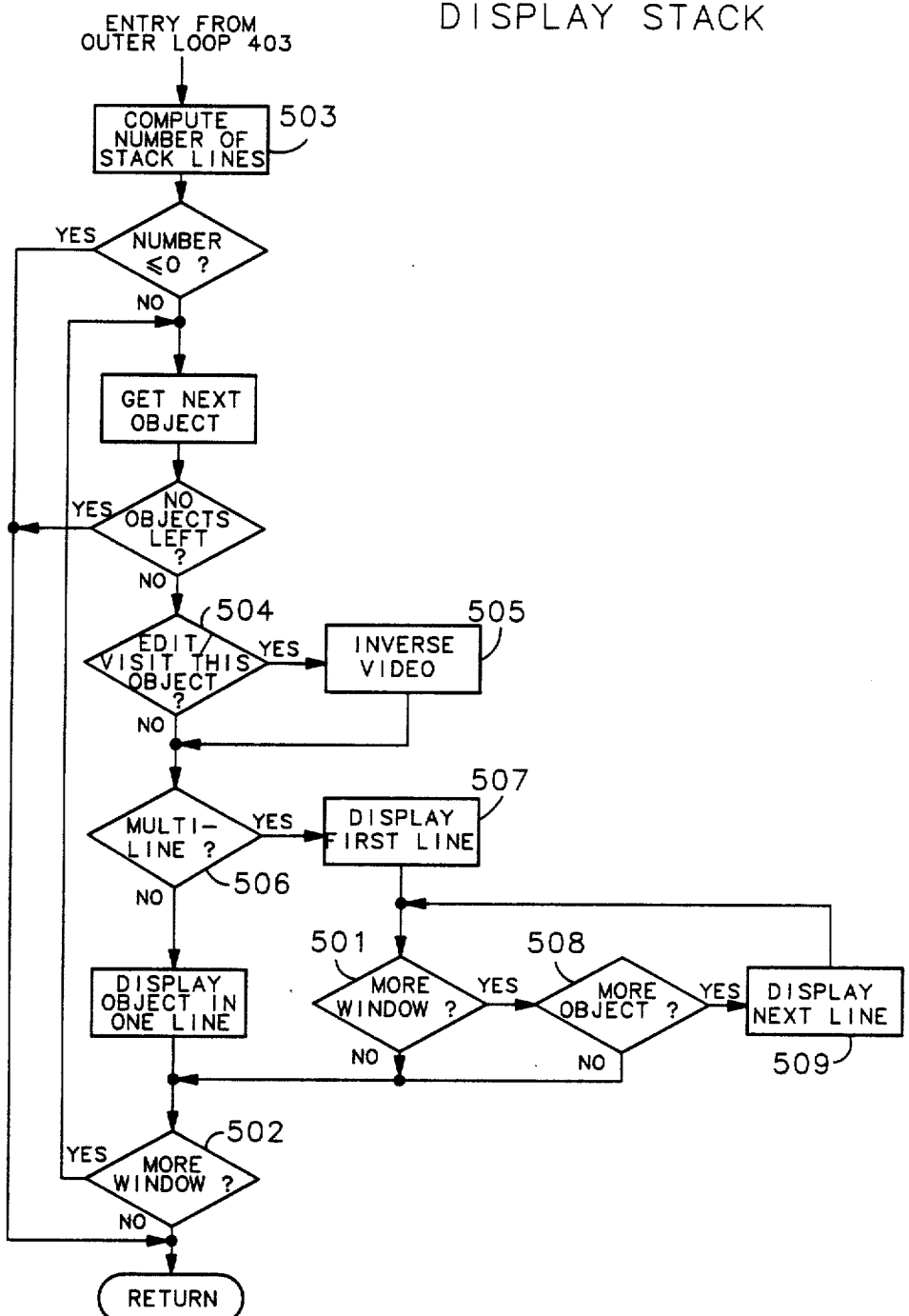
FIGS. 5, 6, 7A, and 7B are expansions of the key portions of FIG. 4.

FIG. 5 shows the logic of the display stack operation 403. The display 103 can display four lines of character data. In order of decreasing priority, the normal display contains, starting with the bottommost display line:

1. Zero or one line containing menu key labels, shown in white-on-black characters.

2. Zero to four lines of the current command line entry.

3. Up to four lines of stack objects.

The "window" referred to in FIG. 5 (501, 502) indicates the portion (one to four lines) of the display available for stack object display, determined by the presence of the menu label line and/or the command line display. The number of stack lines (503) is the number of lines available in the window.

If the number of stack lines available is zero or less the display is passed.

If one or more lines are available the next object, if one is available, is accessed for display.

The operations Edit and Visit, initiated by actuation of these shift keys in FIG. 1, referred to in decision function 504, cause an object to be copied from the stack to the command line so that its contents can be edited by the user. If the edited object is simultaneously visible in the command line and stack displays, the stack display of the object is shown in inverse vide (white-on-black function) 505.

Function 506 tests a user-controlled multi-line display mode. If the multi-line mode is active, the first stack object is shown in one or more display lines if required (functions 507, 501, 508, 509). Otherwise, it is shown in a one-line form. All other stack objects are shown on one line.

The Return function 510 is to step 403 is to step 403 of FIG. 4 which returns the display to the stack.

Figure 6:
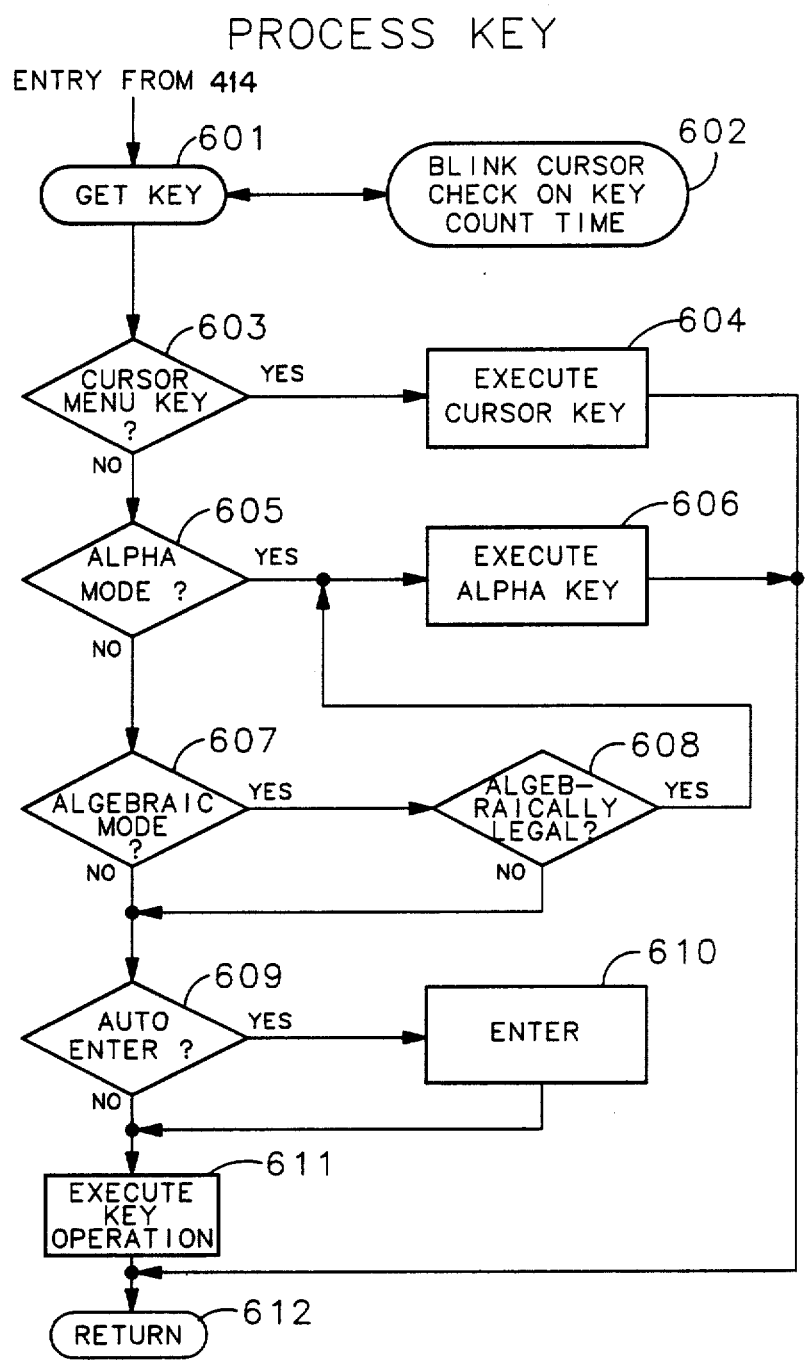

FIG. 6 shows the logical flow of the process key step 414. The GET KEY step 601 is a wait state during which the process flow halts until an execute key press is detected by the electronics. This may be the algebraic mode in which objects may be entered in the command line. This state also can be interrupted (602) by electronic interrupts caused by system timers or the [ON] key 111. The interrupts allow the system to blink the command line cursor, if present, and to update the system clock.

If the multi-function key which is acting is a cursor movement key, a multi-function key press is detected by function 603, and the cursor movement is executed by function 604.

If alpha mode is active as determined at alpha mode function (605), the alpha mode definition of the current key is executed by the execute alpha key function (606). For most keys, this means just adding the key name to the current command line in memory and on the display.

If the algebraic entry mode is active, decision function (607), and the current key is a character key or corresponds to a function that is legal in albegraic expression syntax, as determined at function 608, the alpha mode definition of the current key is executed by the execute alpha key function 606.

If neither alpha nor algebraic entry modes are active, the calculator is in the immediate entry and execute mode, at step 609. If the current key's definition includes an automatic execution of ENTER, the ENTER sequence 610 (see FIG. 7A and 7B) is executed. Finally, the key's immediate entry definition is executed at function (611).

The return 612 is to the outer loop.

Figure 7A:
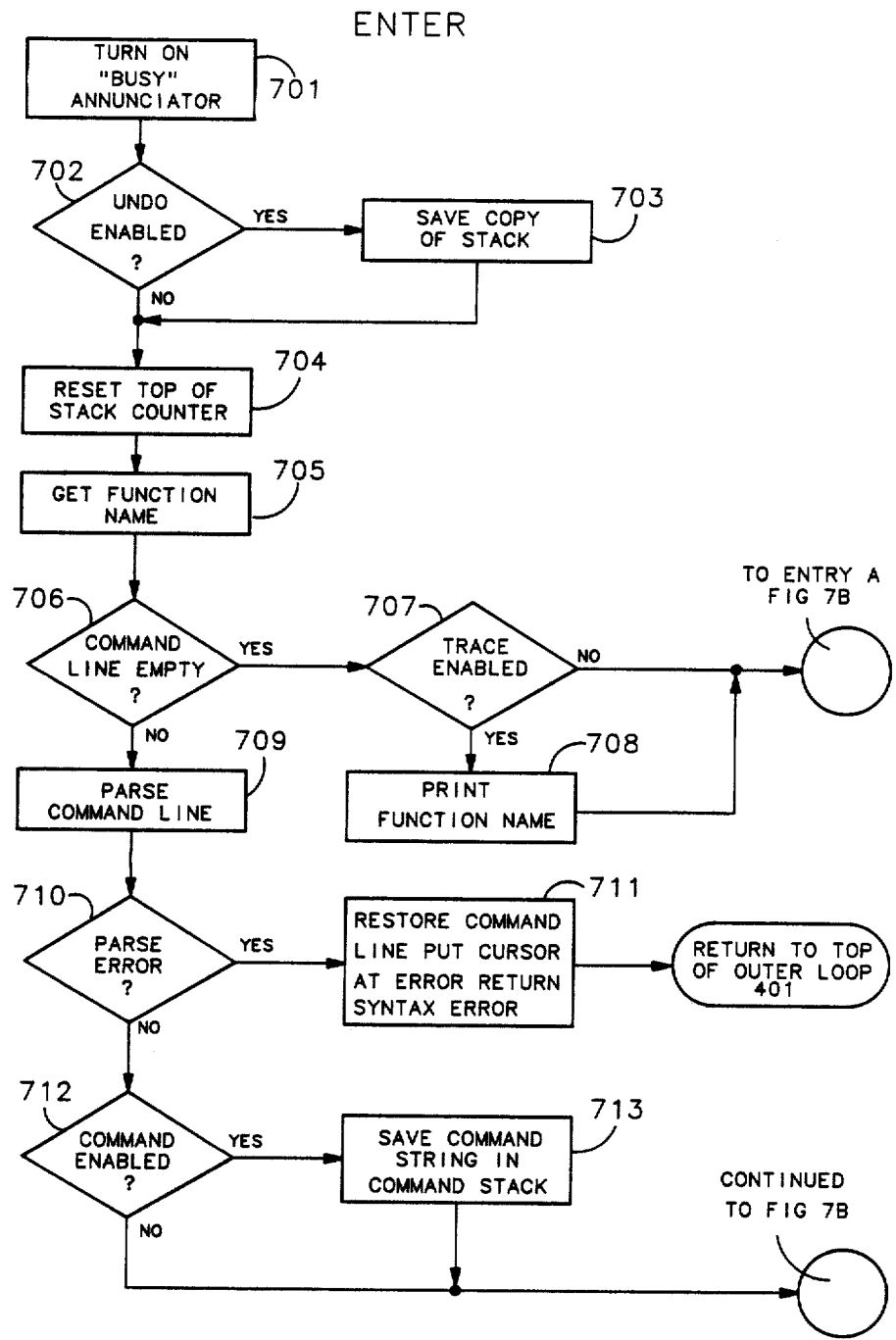
Figure 7B:
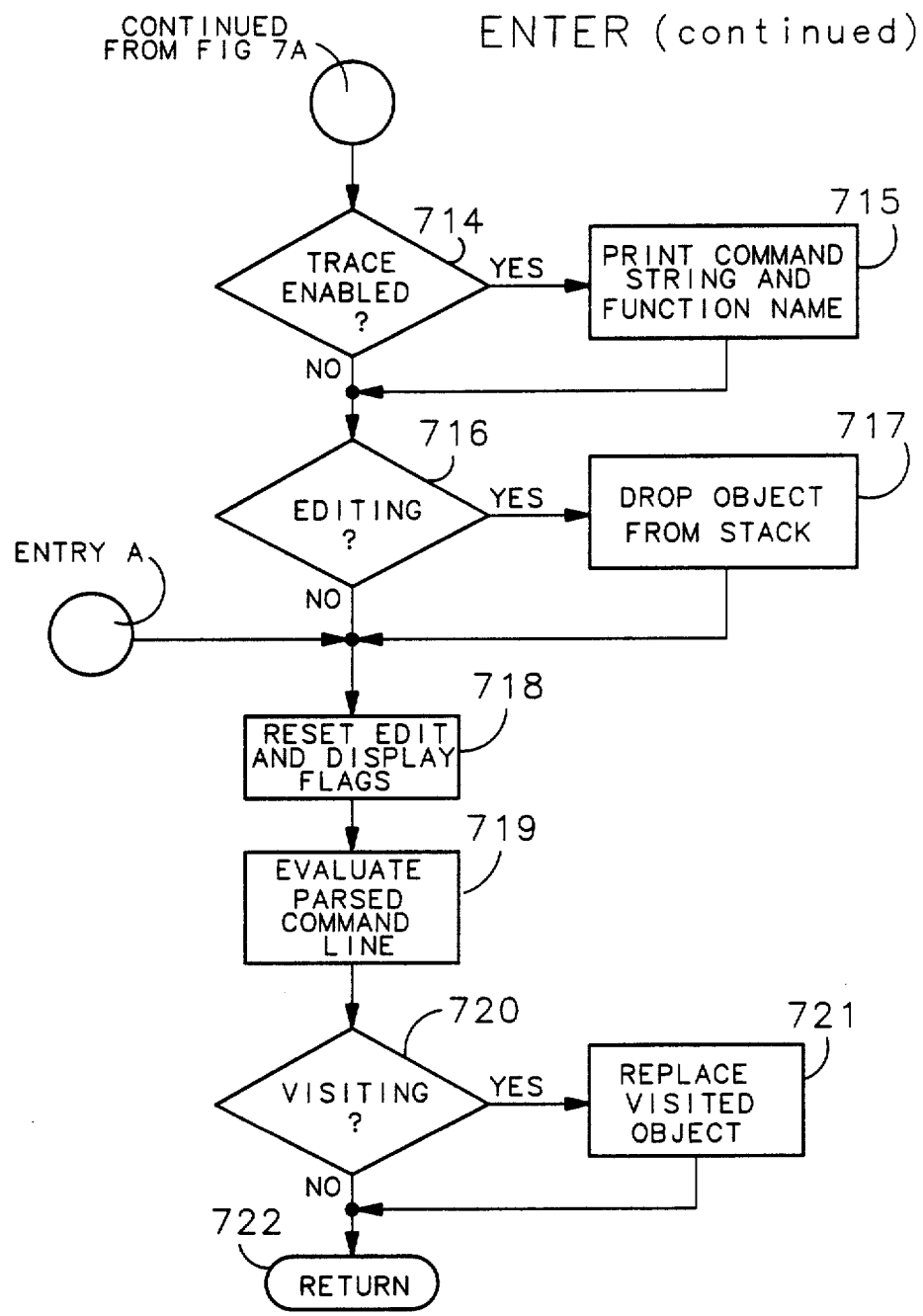

FIGS. 7A and 7B are a flowchart for the logical implementation of the ENTER operation step 610. At the start of the ENTER process, the busy annunciator 701 in the annunciator line 106, not shown in FIG. 1 but referenced in the definitions, is turned on. This is cleared only by the turn of busy annunciator 412 after all resulting processing is complete and the calculator is ready for additional user input.

The UNDO enabled function 702 signifies that the calculator will save a copy of the data stack prior to further processing, for the purpose of error recovery, the save copy of the stack function 703 is initiated.

Step 704 resets the top-of-stack display counter, in case it has been altered by a stack view function.

In step 705, the name of the function corresponding to the current key press is obtained for the purpose of TRACE mode printing. If the command line is empty, decision function 706, initiates the TRACE decision function 707. If the TRACE mode is enabled, the function name is printed. The print function name step 708 causes the function name to be transmitted via the infrared light-emitting diode 110 of FIG. 1.

If the command line is not empty, then the entire command line is parsed, i.e., checked for correct syntax, at the parse command line function 709. If a syntax error is detected at the parse error decision function 710, the command line is restored by function 711, with the cursor at the location of the error within the line, and a Syntax Error message is displayed by this function 711, and control returns to the top of the outer loop 401.

If the command stack is determined to be enabled by the decision function 712, the command line text is saved by function 713 in the 4-level command stack, for possible re-use.

At decision function 714, FIG. 7B, if TRACE is enabled, function 715 causes the contents of the command line, and the current key function name to be transmitted by the infrared light-emitting diode 110 for printing.

If the current ENTER is terminating an edit of the stop stack object, decision function 716, initiates function 717 to drop that object from the stack. Next, an EDIT ENDED determintion 718 is made.

At the evaluate parsed command line function 719, the program presented by the command line entry plus the current key definition is executed. This is the primary user-visible step, representing the execution of the instructions given to the calculator by means of the command line and the terminating key press.

When the command line execution is complete, if the current ENTER terminated the editing (VISIT) of a stack object or a variable, the new topmost stack object is used to replace the original object (721).

The return 722 is to the process or execute key operation 611 as seen in FIG. 6.

To simplify explanation of the error correction ability of the described calculator, a simplified conceptual representation of a primary data stack 901, and a back-up data stack back-up data stack 902 are shown in FIGS. 9A–9G. Primary data stack 901 is used to store data for use in RPN calculations, and back-up data stack 902 is used to store copies of information in data stack 901. Both primary data stack 901 and back-up data stack 902 may be stored in random access memory 205.

Figure 8:
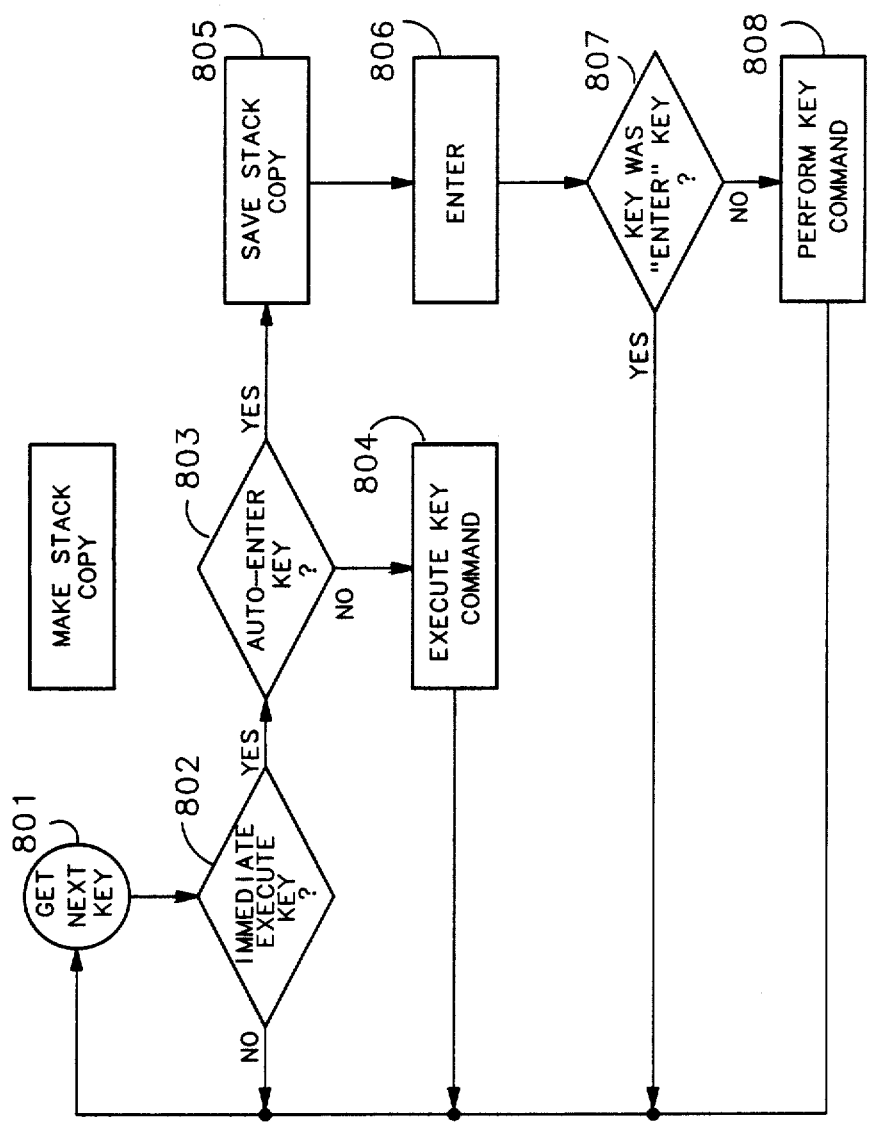
FIG. 8 is a flowchart which shows when a data stack is saved in accordance with an RPN embodiment of the present invention.

FIG. 8 is a simplified flowchart of a program which implements the error correction of an RPN calculator such as the calculator previously described. In step 801 the program waits for a user to depress a key. Once a key is depressed the program in step 802 evaluates whether the key was an immediate execute key. An immediate execute key is a key which causes the contents of the display and/or the contents of the stack to be operated on.

If the depressed key was not an immediate execute key, the monitor waits for the next key. Otherwise, in step 803 the program evaluates whether the key causes the contents of the display to be entered on primary data stack 901. If not, the key command is executed in program step 804. Otherwise, in step 805, the contents of primary data stack 901 are stored in back-up data stack 902. Then in program step 806 the contents of the display are entered into primary data stack 901. The program then evaluates whether the key depressed was ENTER key 105. If so the monitor waits for the next key. Otherwise, the program, in step 808, performs the function specified by the depressed key.

The following is a brief description of an operation in which the changes in the contents of primary data stack 901 and back-up data stack 902 are shown. In FIG. 9A, primary data stack 901 and back-up data stack 902 are shown to be empty. (TOS stands for Top of Stack).

FIG. 9B shows the contents of primary data stack 901 and back-up data stack 902 after a user enters the following sequence:

```
        4
        3
      ENTER
```

The numbers "4" and "3" are not immediate execute keys. ENTER is an immediate execute key, however, primary data stack 901 was empty and therefore no data was transferred into back-up data stack 902.

FIG. 9C shows the contents of primary data stack 901 and back-up data stack 902 after a user enters the following sequence:

```
        5
        7
      ENTER
```

As can be seen, before entering 57 onto primary data stack 901, the contents of primary data stack 901 are duplicated onto back-up data stack 902.

FIG. 9D shows the contents of primary data stack 901 and back-up data stack 902 after a user enters the following key stroke:

```
        +
```

In this case the contents of primary data stack 901 is duplicated onto back-up data stack 902 before adding the contents within primary data stack 901.

Backing up to the state of primary data stack 901 and back-up data stack 902 shown in FIG. 9B, a user might enter the following alternate sequence:

```
        5
        7
        +
```

Then the contents of primary data stack 901 and back-up data stack 902 would be as shown in FIG. 9E. Since the immediate execute key ENTER was not entered before the immediate execute key "+", the number "57" was not entered onto data stack 901. Therefore, when primary data stack 901 (as shown in FIG. 9B) was duplicated onto back-up data stack 902 (as shown in FIG. 9E), only the number "43" is duplicated.

Figure 9G:
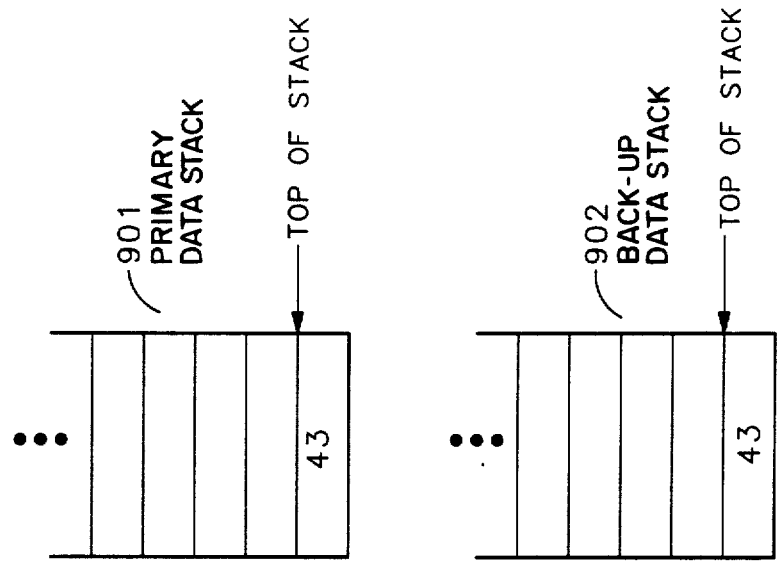

If at this point a user were to depress Shift key 107 followed by UNDO key 120, depending on implementation, the contents of primary data stack 901 and back-up data stack 902 are exchanged as shown in FIG. 9F, or the contents of primary data stack 901 is replaced by the contents of back-up data stack 902 as shown in FIG. 9G.

Figure 10:
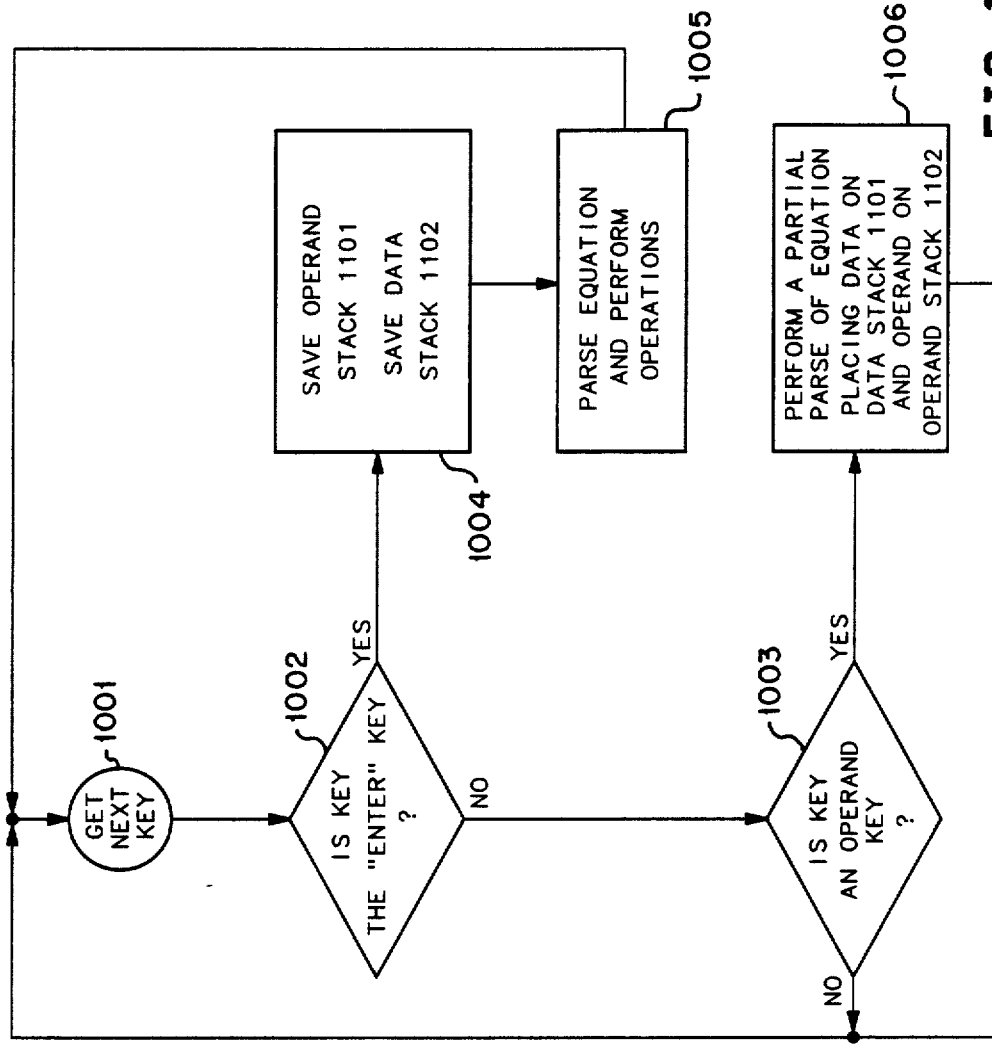
FIG. 10 is a flowchart which shows how the invention can be implemented in a non-RPN embodiment.

The invention may be used in alternate embodiments. For example, FIG. 10 is a flowchart which describes how the present invention may be implemented one of many embodiments of non-RPN calculator having an operator stack 1101, a data stack 1102, a back-up operator stack 1103 and a back-up data stack 1104. The flowchart in FIG. 10 has steps 1001, 1002, 1003, 1004, 1005 and 1006 as shown. Operator stack 1101, data stack 1102, back-up operator stack 1103 and back-up data stack 1104 are shown in FIGS. 11A–11F.

The following is a brief description of an operations in which the changes in the contents of operator stack 1101, data stack 1102, back-up operator stack 1103 and back-up data stack 1104 are shown. In FIG. 11A, operator stack 1101, data stack 1102, back-up operator stack 1103 and back-up data stack 1104 are shown to be empty.

FIG. 11B shows the contents of operator stack 1101, data stack 1102, back-up operator stack 1103 and back-up data stack 1104 after a user enters the following sequence:

```
        4
        3
        +
```

Entering the operator "+" causes a partial parsing of the equation and values are put on both operator stack 1101 and data stack 1102.

Figure 11C:
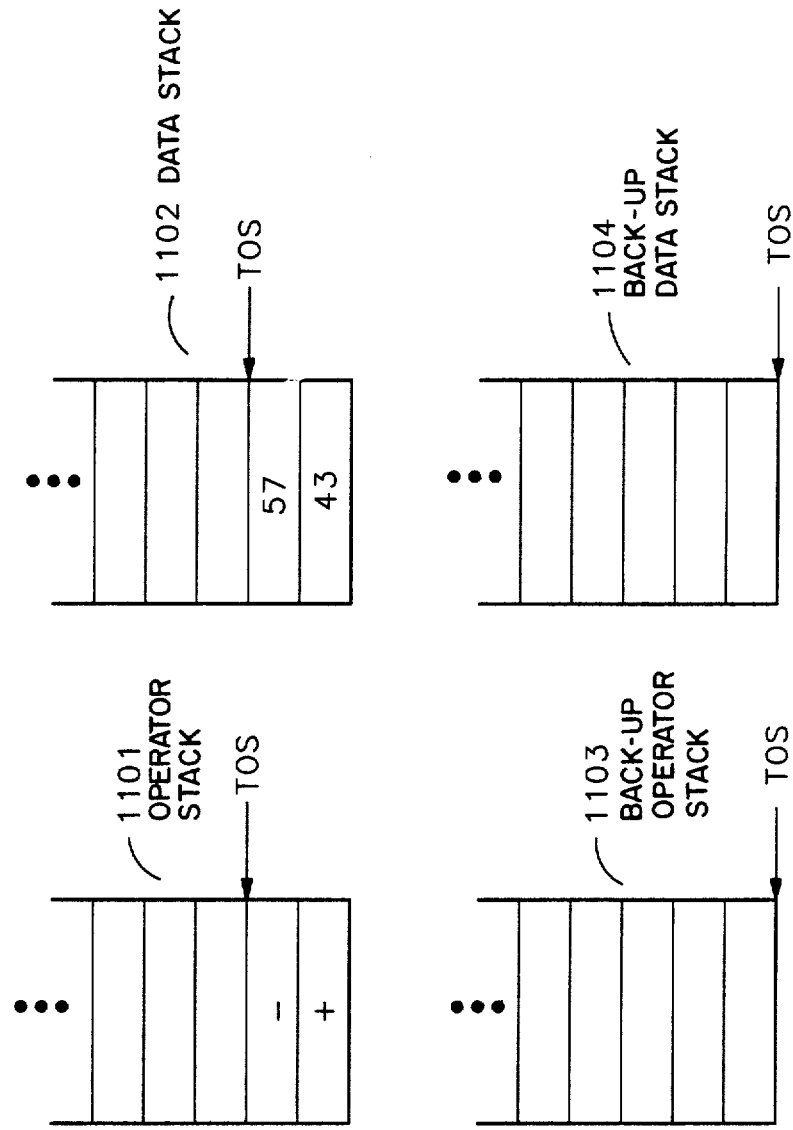

FIG. 11C shows the contents of operator stack 1101, data stack 1102, back-up operator stack 1103 and back-up data stack 1104 after a user enters the following sequence:

```
        5
        7
        —
```

Figure 11D:
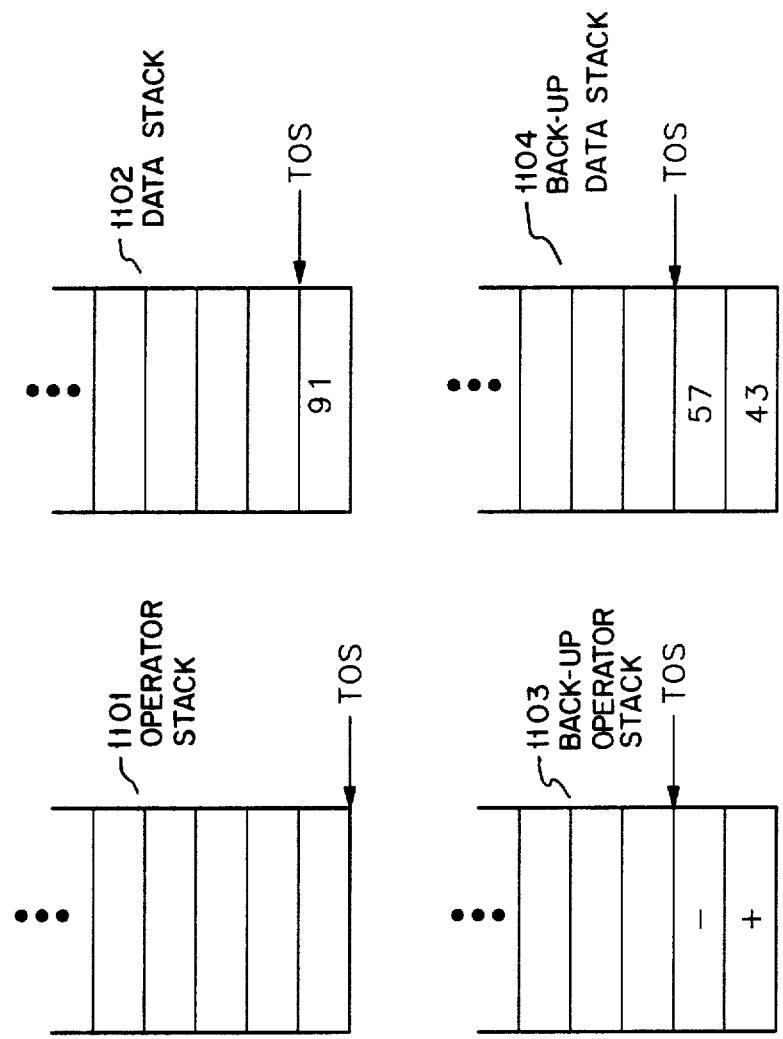

FIG. 11D shows the contents of operator stack 1101, data stack 1102, back-up operator stack 1103 and back-up data stack 1104 after a user enters the following sequence:

```
        9
      ENTER
```

The contents of operator stack 1101 and data stack 1102 are saved in back-up operator stack 1103 and back-up data stack 1104 respectively before performing the calculation.

Figure 11E:
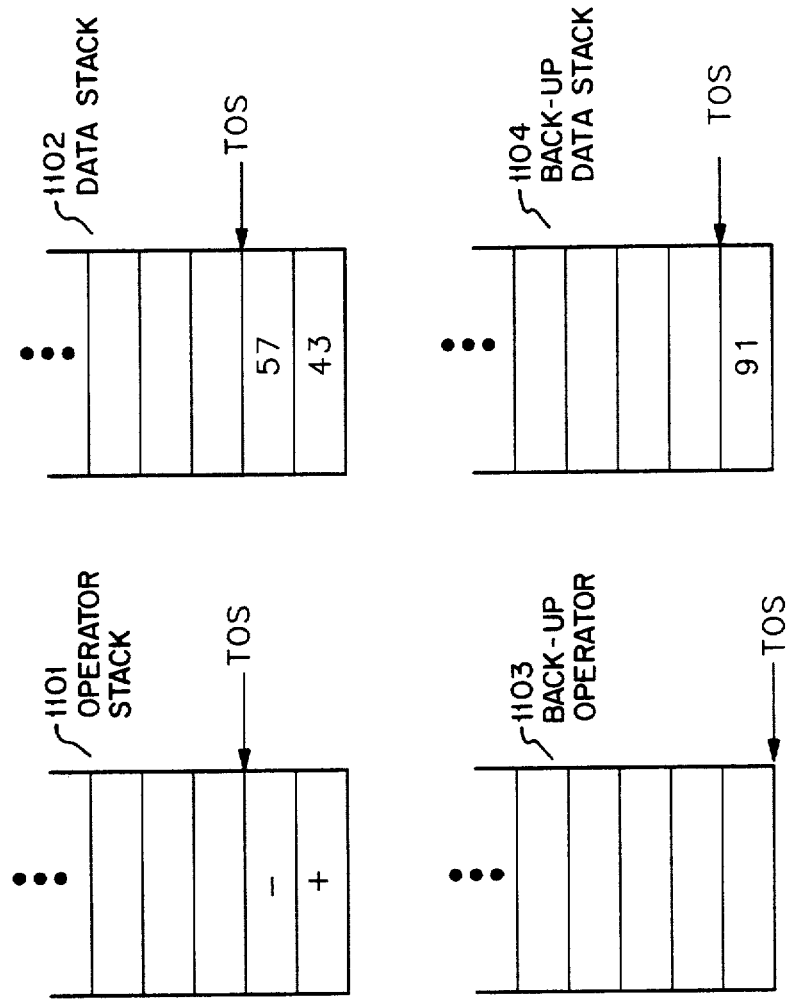
Figure 11F:
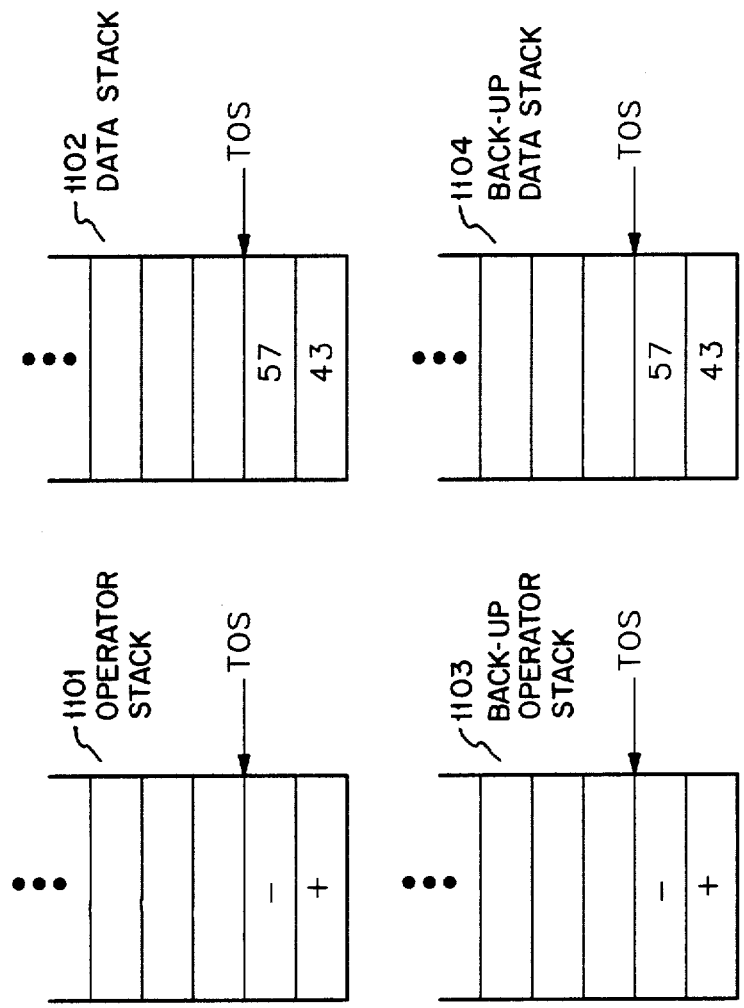

If a user at this point were to depress an "UNDO key, dpending on implementation, contents of operator stack 1101 and data stack 1102 would be exchanged with the contents of back-up operator stack 1103 and back-up data stack 1104 respectively as shown in FIG. 11E, or the contents of operator stack 1101 and data stack 1102 would be replaced by the contents of back-up operator stack 1103 and back-up data stack 1104 respectively as shown in FIG. 11F.

We claim:

1. In a calculator having a data stack which contains first data to be operated upon, an apparatus capable of performing error recovery comprising:
    calculating means coupled to the data stack for performing calculations utilizing the first data to produce second data and for placing the second data on the data stack;
    storage means coupled to the data stack for receiving and storing the first data before the first data is utilized by the calculating means in performing calculations; and,
    restoring means, coupled to the data stack and the storage means, for restoring the first data to the data stack.

2. A device as in claim 1 wherein the restoring means includes an exchange means for storing the second data in the storage means.

3. A calculating device comprising:
    operator storage means for sequentially storing operators;
    data storage means for sequentially storing data;

calculating means coupled to the operator storage means and the data storage means for performing calculations utilizing operators stored in the operator storage means and data stored in the data storage means;

operator replication means coupled to the operator storage means for storing a replication of the sequence of operators stored in the operator storage means; and, first operator replacing means coupled to the operator replication means and the operator storage means for replacing the contents of the operator storage means with the contents of the operator replication means.

4. A calculating device as in claim 3 additionally comprising:

data replication means coupled to the data storage means for storing a replication of the sequence of data stored in the data storage means; and, first data replacing means coupled to the data replication means and the data storage means for replacing the contents of the data storage means with the contents of the data replication means.

5. A calculating device as in claim 4 wherein the first operator replacing means includes a second operator replacing means for replacing the contents of the operator replication means with the contents of the operator storage means and wherein the first data replacing means includes a second data replacing means for replacing the contents of the data replication means with the contents of the data storage means.

6. In a calculator having a data stack which contains first data to be operated upon, an apparatus capable of performing error recovery comprising:

user entry means for allowing a user to direct the calculator to perform calculations;

calculating means coupled to the data stack and to the user entry means for performing calculations utilizing the first data to produce second data and for placing the second data on the data stack, the calculations being performed responsive to directions from the user;

storage means coupled to the data stack for receiving and storing automatically the first dta before the first data is utilized by the calculating means in performing calculations; and, undo means, coupled to the data stack, the storage means and the user entry means, for, in response to a user direction, restoring the first data to the data stack.

7. A device as in claim 6 wherein the undo means includes an exchange means for storing the second data in the storage means.

8. A method for providing error correction in a device which performs arithmetic computations and which utilizes a portion of memory configured as a data stack for storing data to be used in arithmetic computations and a portion of memory configured as an operator stack for storing operators to be used in arithmetic computations, the method comprising:

storing the data in the data stack to a first stored location;

storing the operators in the operator stack to a second stored location;

performing an arithmetic computation utilizing the data in the data stack and the operators in the operator stacks;

restoring the original data in the data stack utilizing the data stored in the first stored location; and, restoring the original operators in the operator stack utilizing the operators stored in the second stored location.

9. A method for providing error correction in a device which performs arithmetic computations and which utilizes a portion of memory configured as a data stack for storing data to be used in arithmetic computations and a portion of memory configured as an operator stack for storing operators to be used in arithmetic computations, the method comprising:

storing the data in the data stack to a first stored location;

storing the operators in the operator stack to a second stored location;

performing an arithmetic computation utilizing the data in the data stack and the operators in the operator stacks;

exchanging the data in the data stack with the data stored in the first stored location; and, exchanging operators in the operator stack with the operators stored in the second stored location.

* * * * *